Feb. 18, 1941. M. MAUL Re. 21,719

PUNCHING MACHINE FOR RECORDS

Original Filed Feb. 11, 1931 4 Sheets-Sheet 1

Inventor:
Michael Maul

Feb. 18, 1941. M. MAUL Re. 21,719

PUNCHING MACHINE FOR RECORDS

Original Filed Feb. 11, 1931 4 Sheets-Sheet 2

Inventor:
Michael Maul

Feb. 18, 1941. M. MAUL Re. 21,719

PUNCHING MACHINE FOR RECORDS

Original Filed Feb. 11, 1931 4 Sheets-Sheet 3

Inventor:
Michael Maul

Feb. 18, 1941. M. MAUL Re. 21,719

PUNCHING MACHINE FOR RECORDS

Original Filed Feb. 11, 1931 4 Sheets-Sheet 4

Inventor:
Michael Maul

Reissued Feb. 18, 1941

Re. 21,719

UNITED STATES PATENT OFFICE 21,719

PUNCHING MACHINE FOR RECORDS

Michael Maul, Berlin-Johannisthal, Germany, assignor to the firm Deutsche-Hollerith Maschinen G. m. b. H., Berlin-Lichterfelde, Germany Original No. 1,962,607, dated June 12, 1934, Serial No. 515,070, February 11, 1931. Application for reissue November 28, 1939, Serial No. 306,582. In Germany February 17, 1930

23 Claims. (Cl. 164—113)

In record cards serving for the control of sorting and tabulating machines there are usually provided a plurality of adjacent record columns. Accordingly, in such record cards only a single longitudinal row of record columns is provided and for this reason perforation of such cards may be effected under the control of a single set of keys corresponding to a single record column, in one of the following ways:

In machines having a row of punching stamps for each record column, the various rows of punches are brought successively under the control of said single set of keys and are preparatorily set up whereas punching is effected simultaneously in all record columns; in machines, however, having a single row of punching stamps the record columns are punched successively by said single row of stamps which are also under the control of a single set of keys.

In order to utilize the card space to the greatest possible extent and to maintain at the same time a favorable relation between the width and the length of the card, a plurality (preferably two or three) of superpositioned rows of record columns have been provided on the card and such provision is of particular advantage in hole combinational record cards. Such superpositioned rows of record columns are termed "record decks." Accordingly, a record card of the type referred to comprises a plurality of superpositioned record decks, each deck consisting of a plurality of adjacent record columns.

However, the above mentioned perforating machines cannot be used for the perforation of record cards having a plurality of record decks since said machines permit only a column selection in longitudinal direction of the row of record columns while the perforation of record cards having a plurality of record decks requires in addition to the columnary selection a selection transversely to the rows of record columns, i. e. a selection of the record deck in which one or a plurality of record columns are to be punched.

Now, for said purpose perforating machines have been suggested wherein in addition to the movement of the card in longitudinal direction relatively to a common set of punching stamps, the selection of the record decks may be effected by a transverse movement of the card which is effected by means of an adjusting mechanism adapted to adjust the card transversely to the rows of record columns relatively to said set of punching stamps; accordingly, said set of punching stamps is not only common to all record columns, but also to all record decks. In such machines, of course, said single set of punching stamps is always in operative connection with a single set of keys controlling said punching stamps.

The adjustment of the record card in the described manner requires, however, a complicated adjusting mechanism since the latter must permit movement of the card in two directions at a right angle to each other and yet the card must correctly be presented to the punching stamps since it is of great importance for the analysis of record cards that the holes are exactly provided on the predetermined hole positions. This requirement, however, can only be met with an adjusting mechanism of the type referred to if the same is maunfactured very precisely, which, of course, increases the manufacturing costs of the machine.

Another essential disadvantage of said known way to perforate cards having a plurality of record decks must be seen therein, that due to the movement of the card for deck selection the dimensions of the machine are influenced in a very unfavorable manner, particularly if record cards having more than two record decks are handled since there must be sufficient space for the movement and adjustment of the card longitudinally and transversely to the common set of punching stamps.

The main aim of the present invention is to overcome the above mentioned disadvantages and to provide a novel and efficient machine with small dimensions for record cards having a plurality of record decks.

To attain said purpose, it is the main object of the present invention to provide a punching machine comprising an individual set of punching means for each record deck and a common set of keys adapted to govern said punching means column by column, and shifting means common to all keys of said set of keys for governing selectively any one of said sets of punching means by said common set of keys.

Another object of the invention is to provide in a machine of the character referred to punch selecting means through which said punching means may be governed by said single set of keys and still another object of the invention is to provide an individual set of punch selecting means for each set of punching means.

A further object of the invention is to provide a machine of the character referred to having a single row of punching stamps for each record deck and means for moving the card and the stamps relatively to each other upon key actuation.

Still a further object of the invention is to provide a machine of the character referred to wherein the punch selecting means and the record card are moved column by column relatively to each other upon key actuation.

Another object of the invention is to provide a machine of the character referred to adapted to produce hole combinational perforations.

A further object of the invention is to provide in a machine of the character referred to individual sets of actuating means for each set of punching means, and means for selecting said actuating means for operation by means of said shifting means.

A further object of the invention is to provide in a machine having an individual set of punching stamps for each record deck, a distance between said sets of punching stamps in the direction of superpositioned aligned record columns, said distance being larger than the distance between adjacent punching stamps of each set in the same direction.

A further object of the invention is to provide sidewardly extending projections on the punching stamps on which projections engage springs adapted to keep the punches in their normal position.

A further object of the invention is to provide a machine of the character referred to having a set of numeral keys and a set of letter keys both sets of keys being adapted to be commonly connected by said shifting means to the punching means for any record deck.

Another object of the invention is to provide an electrical machine of the character referred to which provides a set of punch selector magnets and a punch actuating magnet for each record deck.

If the invention is applied to machines wherein the punches are depressed simultaneously with the actuation of a key, only a set of punching stamps for a single column of each record deck must be provided which sets may be selectively governed by the common set of keys whereas in machines in which all hole positions of a card or deck are punched simultaneously, punching stamps must be provided for each hole position of each record deck if the present invention is applied. Of course, the invention may also be used in connection with machines having key controlled punch selectors.

Further objects and advantages of the invention will be seen from the following specification and the claims.

A preferred embodiment of the invention will now be described in connection with the accompanying drawings.

Figure 1:
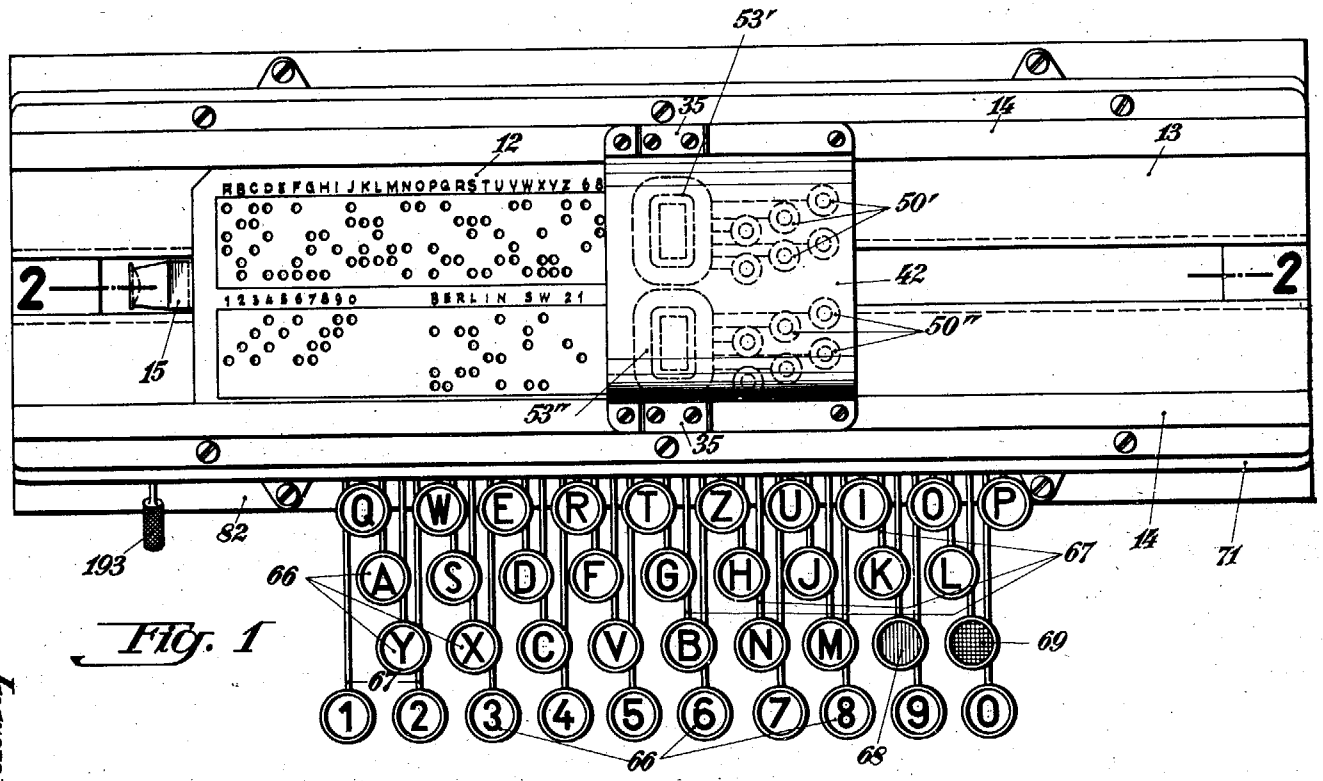
Fig. 1 is a top view of the punching machine in which a punched card is inserted.

The punching machine illustrated in the drawings includes a frame upon which the card may be fed step by step by means of a carriage underneath the punching mechanism. The frame is mounted upon a casing in which the key mechanism is arranged, under the control of which punching in each column may be effected, whereupon the carriage feeds the next column of the card under the single row of punching stamps.

*Card feed*

The record card 12 (Figs. 1 and 2) to be punched is fed in the bed 13 of the frame 14 of the machine step by step by means of the carriage—still to be described—from the extreme right hand position to the extreme left hand position. The carriage comprises in a generally known way two end pieces 15 and 16 between which the card is positioned, and the shift bar 17 for the step by step movement of the carriage. Said end pieces 15 and 16 as well as the shift bar 17 are fastened to the guide pieces 18 and 19 adapted to slide in grooves 20 of the frame 14. The control of the shift bar 17 is effected by means of an escapement 21 which is under the electromechanical control of the keys. The escapement 21 is arranged between two lips 22 and 23 (Figs. 2 and 3) and is held by means of two springs 24 and 25 in engagement with the teeth of the shift bar 17 in such a way that normally the left tooth of the escapement 21 is in engagement with the teeth of the shift bar 17 and the spring 24 is strong enough to counter-balance the action of spring 25 and member 26 which tends to draw the carriage to the left. The escapement is guided by means of a slot by a pin 27 provided upon the lip 22, and is drawn against the stop pin 28. If the carriage is to be fed for one step to feed the next column of the card under the punching stamps, the magnet 29 will be energized whereby the escapement 21 will be rocked in counterclockwise direction (Fig. 2) about the pivot 27 so that the right hand tooth of the escapement 21 engages the toothed bar 17, however, preventing shifting of the same. As soon as the magnet 29 is deenergized, the spring 24 will draw the escapement 21 back to its home position and then the left-tooth of the escapement 21 will come just behind a tooth of the bar 17 so that the spiral spring arranged in the casing 30 will draw the toothed bar 17 by means of the member 26 to the left until the next steep edge of a tooth of the bar 17 is stopped by the left tooth of the escapement 21 in which case the carriage has been shifted just for one record column.

If it is desirable to shift the carriage not step by step to its extreme left hand position, but to release the carriage entirely so that it will immediately run back to its home position, the magnet 31 (Fig. 3) provided on the lip 23 will be energized and the same will attract its armature 32 fastened to the escapement, against the action of springs 24 and 25 (see Fig. 2) so that the escapement 21 is moved downwardly and entirely out of engagement with the toothed bar 17, the pins 27 and 28 serving then as guides for the escapement. Thereupon the carriage is drawn under the action of the spring provided in casing 30 to its extreme left hand position.

If the carriage is in the extreme right hand position, the first record column of each of both decks of an inserted blank card is just under the row of punching stamps and if the carriage is in its extreme left hand position the last record column of each of both decks is under said stamps. In the record card 12 shown in Fig. 1 there are provided two decks above one another, each deck containing—depending upon the meaning of the different fields of the cards—certain letter and numeral data represented by perforations. The card in Fig. 1 is not divided into fields of certain meaning and the perforations are only given as examples. Since the application of perforated record cards for the control of sorting and tabulating machines is well known, it seems not to be necessary to explain said application more in detail.

*Punching mechanism*

The record card 12 is fed between the matrix 34 fastened on the frame 14 (Figs. 1 and 3) and between a block 35 carrying the punching stamps. By depressing the punching stamps either singly or in different combinations, the card may be punched in the upper or lower deck. The block 35 is on the outer parts together with the matrix 34 fastened upon the frame of the machine. The block is provided with a group of six punching stamps 33′ and a group of six punching stamps 33″ (Fig. 3), the first group serving for the perforation of the upper and the other group for the perforation of the lower deck of the card. Like parts which are provided for each deck individually, will be designated in the following specification generally with the same reference numbers and, if necessary, the parts being provided in the upper deck will be designated by one and the parts being provided in the lower deck will be designated by two indexes. Thus for instance, the punching stamps are usually named in the specification by 33, but thereby I mean the punching stamps 33′ of the upper as well as the punching stamps 33″ of the lower deck and this index designation is provided conformably for all parts being separately coordinated to each of both decks, such as for instance for the selector magnets, the punch magnets and so on. The matrix 34 is provided opposite the punching stamps 33 with corresponding holes into which said stamps may pass when the card is being punched. The waste produced by the perforations, drops outside of the machine through slots 38 (Fig. 3) provided in the frame 14. Each of the punching stamps 33 is resiliently mounted in the block 35 and is provided on its upper end with a head 39 having two sidewardly extending projections (Figs. 2 and 3), and the heads of the stamps extend through the slotted plate 40. The springs 41 mounted in borings of the block 35 hold the projections of the heads 39 normally against the plate 40 so that the record card is permitted to move freely underneath the punching stamps.

Figures 2, 7:
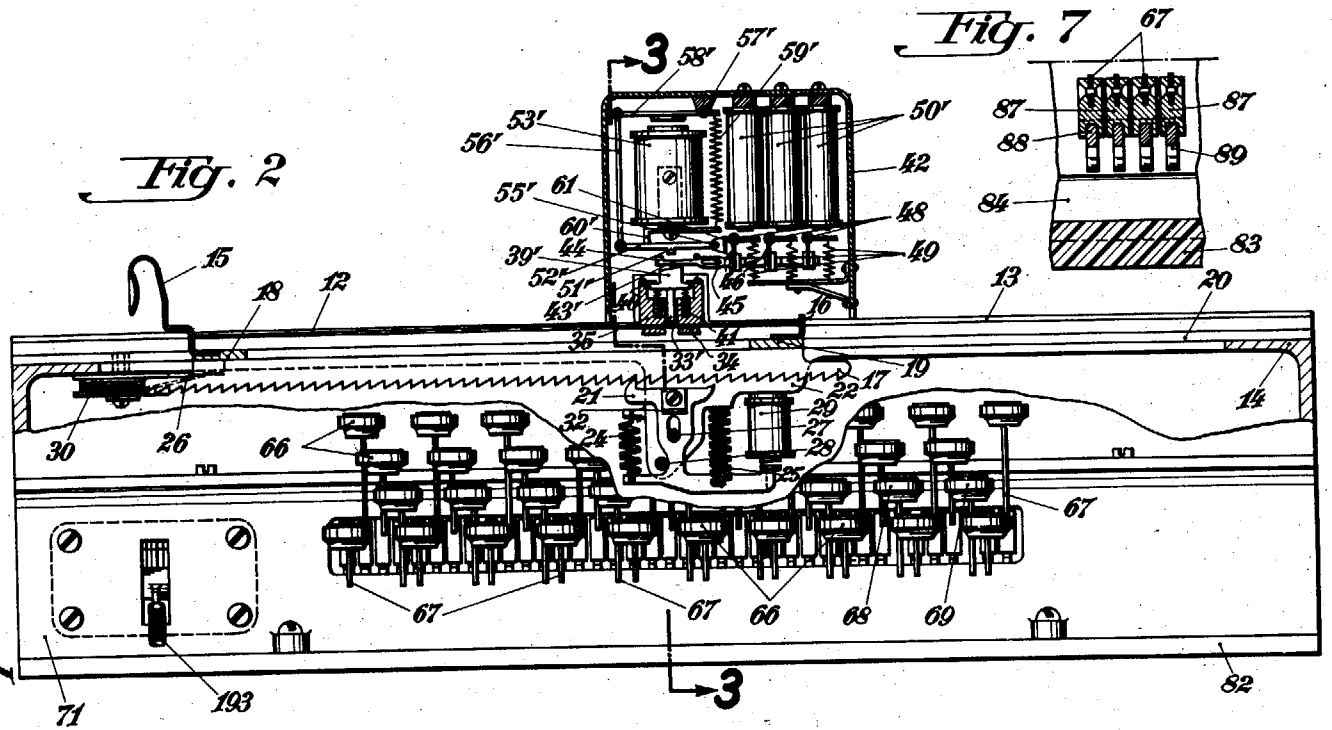
Fig. 2 shows partly a sectional and partly a front view of the machine, the section being taken on line 2—2 of Fig. 1; the section is taken in the middle part of the machine through a punching stamp to illustrate the position of the same.
Fig. 7 is a detail view showing a section through the key levers.
Figure 3:
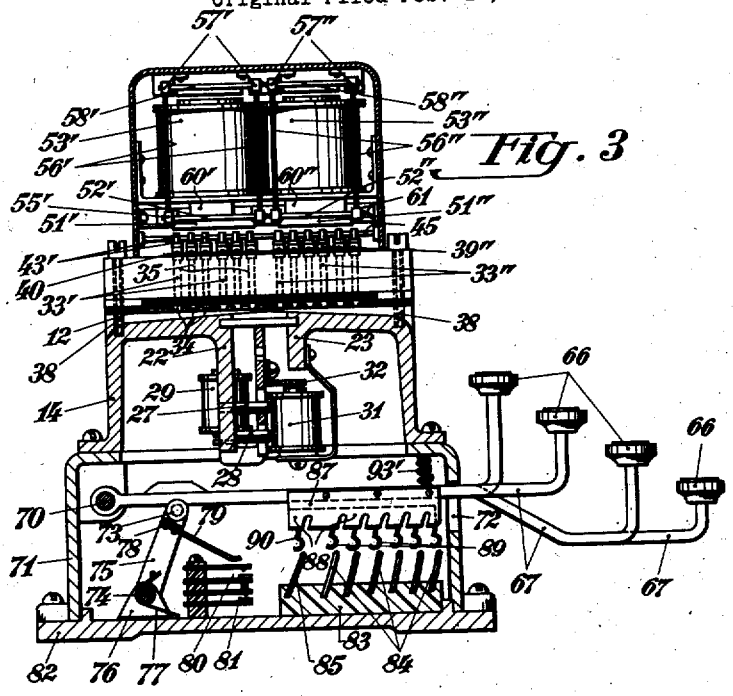
Fig. 3 is a section through the machine on line 3—3 of Fig. 2.

The control of the punching stamps is effected by a magnet mechanism now to be described; said mechanism is arranged in the casing 42 fastened to the frame 14 of the machine (Figs. 1–3). To each punching stamp is a slide bar 43 coordinated having projection 44 and being guided by means of a slot upon a bar 45 which is common to all slides. The rear end of each slide 43 is connected by means of a pin and slot connection with a bell crank lever 46 and the various bell crank levers are pivotally mounted upon bars 48 and the slides 43 are normally held by springs 49 against the bar 45, in the position as illustrated in Fig. 2. The bell crank levers 46 form the armature of selector magnets 50 being provided in the same number as the punching stamps and said magnets are adapted to rock upon energization their corresponding bell crank levers 46 in counterclockwise direction (Fig. 2), thereby moving the projection 44 of the corresponding slide bar 43 under the yoke 51 (Figs. 2 and 3) of a plate 52, said yoke being under the control of a punch magnet. While to each punching stamp 33 a control slide 43, bell crank lever 46 and selector magnet 50 is coordinated, for the group of the upper six punching stamps 33′ there is provided a special common punch magnet 53′ and for the group of the lower six punching stamps 33″ there is provided a special common punch magnet 53″. To each of both punch magnets 53 is a plate 52 coordinated, being pivotally mounted at 55 (Figs. 2 and 3) and having a yoke 51; the plates are connected by means of bars 56 with armature plates 58 pivotally mounted at 57. The armature plate 58 of each group of six stamps is normally drawn in counterclockwise direction by spring 59 so that the punching plate 52 is held in engagement with the stop support 60. The punch mechanism provided for each group of punching stamps may be clearly seen from the drawings in which the parts of both groups are also designated in the above described manner by different index references. The member 60 forms also the support for the punch magnets 53 and is fastened to the side walls of the casing 42. The pivots 55 of the punching plates 52 are provided in eyes of a cross bar 61 fastened on the casing 42.

Upon a punching operation, the selector magnets 50 of the upper or the lower group of punching stamps are energized either singly or in different combinations and thereby the controlling slide bars 43 are moved to the right (Fig. 2) so that the projections 44 are positioned below the yoke 51. If a perforation is to be effected in the upper deck, one or a plurality of slides 43′ will be moved to the right under the control of the selector magnets 50′ and thereupon the punch magnet 53′ will be energized. Consequently, the link connections 58′—56′—52′ will be drawn downwardly and the yoke 51′ will encounter the projections 44 of all slide bars 43′ which have been moved to the right, while the slide bars 43′ remaining in the left position will not be encountered by the yoke 51′. By depressing the yoke 51′, the slides 43′ which have been moved from their normal position, will be rocked slightly downwardly about the pivot 45 and the heads 39′ and consequently the corresponding punching stamps 33′ are depressed far enough against the action of springs 41 to punch the holes into the card. If then the punch magnet and the selector magnets are again deenergized, the parts return under the influence of their restoring springs in reverse time sequence to their home position. It will be seen that by energization of one punch magnet simultaneously all holes of a certain hole combination column of one deck will be punched.

It will also be clearly seen that a similar punching operation takes place if a perforation is to be effected in the lower deck by means of the punching stamps 33″ and punch magnet 53″. After the perforation is completed in one column the carriage is shifted so that the various columns of one deck may be punched one by one.

*Key mechanism*

Figure 4:
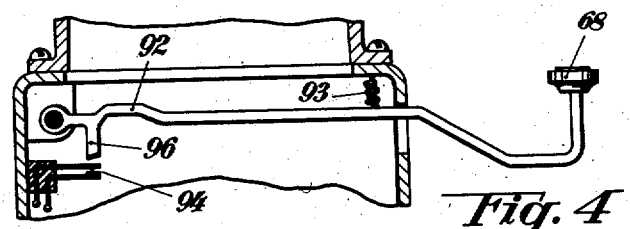
Fig. 4 is a detail view illustrating the key mechanism for the control of the carriage feed independently of the punching operations.

In order to control the perforation operation in any one of both decks, there is a set of letter and numeral keys 66 (Figs. 1–3) provided. For the control of the carriage serves also the carriage shift key 68 and the release key 69 which may be distinguished for instance by different colors. The key levers of all keys are pivotally mounted upon a common cross bar 70 (Fig. 3) and are held by means of springs 93′ and a frame which is still to be described, in their normal position, in which the key levers engage the upper edge of a key slot 72 provided in the casing 71. The key levers are held in proper distance from one another by means of distance tubes seated upon the bar 70, but not illustrated in the drawings. The member which is adapted to hold all keys resiliently in their upper position—in addition to the springs 93′—comprises a rigid frame including two cross bars 73 and 74 which are connected at their ends by yokes 75. The bar 74 is pivoted in bearings 76 and the springs 77 wound on both ends around the bar 74, tend to rock the yokes 75 in counterclockwise direction (Fig. 3) so that the key levers 67 are resiliently held in their upper position by the bar 73. The yokes 75 are also connected with one another by a cross bar 78 and in the middle portion of the same is a finger 79 fastened, acting upon the contacts 80 and 81 which are insulatingly arranged from one another. If therefore one of the letter or numeral keys is depressed, the frame 73, 74, 78, 75 will be pressed downwardly against the action of its springs 77, and the finger 79 closes at first the contact 80 and if the actuated key reaches its lowermost position also the contact 81 will be closed which latter controls shifting of the carriage. The base plate 82 upon which the casing 71 is mounted, carries also the insulating block 83 being provided with six contact bars 84 extending at right angles to the key levers underneath the same and being adapted to cooperate either singly or in different combinations with contact fingers of the key levers. Another contact bar 85 forms the common back line for all keys. As will be seen from Fig. 3 and the detail view according to Fig. 7, on each of the key levers 67 is an insulating bar 87 fastened having on the lower side a metal bar 88 inserted therein. On the bars 88 of the key levers are contact fingers 89 in different arrangement provided. The bar 88 of each key lever is provided in addition to fingers 89 with a contact finger 90 adapted to cooperate with the contact bar 85 which is common to all keys. Each of the key levers has a contact finger 90 while the fingers 89 are provided in accordance with the perforations of the hole combinational key illustrated in Fig. 1; this may be clearly seen from a comparison of the card in Fig. 1 and the circuit diagram in Fig. 8, so that it seems not necessary to explain this arrangement more in detail. The timing of the various parts is such that at first all fingers 89 (Fig. 3) and finger 90 of the depressed key contact the bars 84 or 85 respectively and that upon further depression of the key finally the contact 80, and only in the lowermost key position also the contact 81 will be closed. If the key is released again, all parts will return under the influence of the frame 73, 74, 75 to their home position and the plate spring contacts 80, 81 will open again. The keys 68 and 69 (see Figs. 1, 2 and 4) for the control of the carriage independently of any punching operation are both similarly constructed and for this reason only one of them is illustrated in Fig. 4. These keys are provided with a recess 92 and are therefore not held in their upper position by the frame 73, 74, 75, but a special spring 93 is coordinated for this purpose to each of said keys. Upon depression of any of said keys, said frame will therefore not be rocked and the contacts 80, 81 (Fig. 3) will remain open. To each of the keys 68 and 69 is, however, a special contact 94 and 95 respectively coordinated (see also Fig. 8) which may be closed by a projection 96 of the respective key.

In the present embodiment of the invention, closure of controlling contacts is effected by the above described cooperation of contact fingers with contact bars. It will, of course, be understood that any other equivalent arrangement might be made: so for instance the key could control in a generally known way slidably mounted recessed bars, each of said bars controlling in turn a coordinated contact.

*Selection of the hole combination decks*

Through the frame wall of the machine extends a handle 193 of a switch which is arranged in the interior of the casing 71 (Fig. 2); said handle serves for the selection of the deck to be perforated. Since in the present case only two hole combination decks are provided, the switch may be shifted into any one of two different shift positions. If the handle 193 is in its upper position, the upper hole combination deck will be perforated upon key actuation, and if the handle is in its lower position as shown in Figs. 1 and 2, the characters will be punched into the lower hole combination deck upon actuation of the keys. The arrangement of the deck selection switch within the current circuit, will still be described in connection with Fig. 8, where the switch is shifted to the upper hole combination deck contrarily to its position in Figs. 1 and 2. The switch proper is shown more in detail in Figs. 5 and 6, where the same is shifted (Fig. 6) to its lower position lower deck). The switch includes an insulating plate 182 being fastened on the front wall of the casing 71. Upon this insulating plate is an arched longitudinal insulating piece 183 fastened having slots 184. On the upper inner side of the piece 183 there are seven contact springs 187 and on the opposite lower side there are seven contact springs 188 provided which lead to the outside where they are in electrical contact with screws. The contact springs on the inner side of thhe insulating piece 183 (Fig. 6) may therefore cooperate with the contact lever still to be described and are on the other hand connected to the wires by means of contact screws on the outside of the switch. On the inner side of the insulating piece 183 there are also provided seven other contact springs 189 being in alignment with the contact springs 187 and 188 and being separately arranged from the springs 187 and 188 and side-lips of springs 189 lead through the slots 184 so that the spring contacts may be connected by means of screws 190 to the current circuit. Upon the shaft 191 is an arm 192 pivotally mounted having a handle 193 which extends through the casing 71 (see also Figs. 1 and 2) to the outside of the machine. On the other end of the arm 192 are seven contact springs 194 provided being in alignment with the above mentioned springs 187 and 188.

Figure 6:
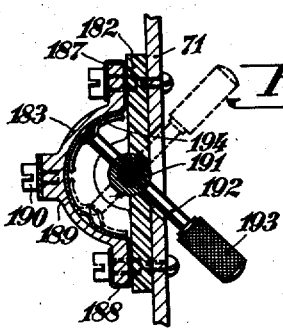
Fig. 6 is a section through the switch shown in Fig. 5.
Figure 5:
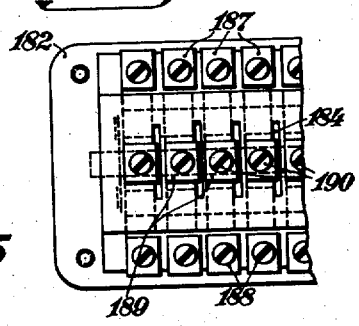
Fig. 5 shows in an enlarged scale a rear view of the switch for the selection of one of the hole combination decks.

As may be seen from Figs. 5 and 6, all contact springs 187 are electrically connected with the contact springs 189 by the bridging contacts 194 if the handle 193 is in the lower position as shown in Fig. 6. However, if the handle is moved to the upper position, as shown in dotted lines, the contact springs 187 are free and a connection will now be established between the contact springs 189 and 188. As may be seen from the drawings, the contact springs are slightly curved in the middle portion so that they are adapted to be resiliently moved and are securely held in position. The contact springs 189 are connected to the contact bars 84 (Fig. 3) by lines 100 (see Fig. 8), while the upper contacts 187 are connected with the selector magnets 50'' of the lower deck and the lower contacts 188 are connected with the selector magnets 50' of the upper deck. If, therefore, the lever 193 is in the lower position (Figs. 2 and 6), the lower six selector magnets 50'' are connected with the contact bars 84 and are therefore inserted into the operating circuit, and consequently the lower hole combination deck will be punched while the magnets 50'' of the upper deck are inoperative. If the lever 193 is shifted to its upper position as shown in Fig. 8, the magnets 50'' of the lower deck are inoperative and the magnets 50' of the upper hole combination deck are connected with the contact bars 84.

*Circuit diagram*

Figure 8:
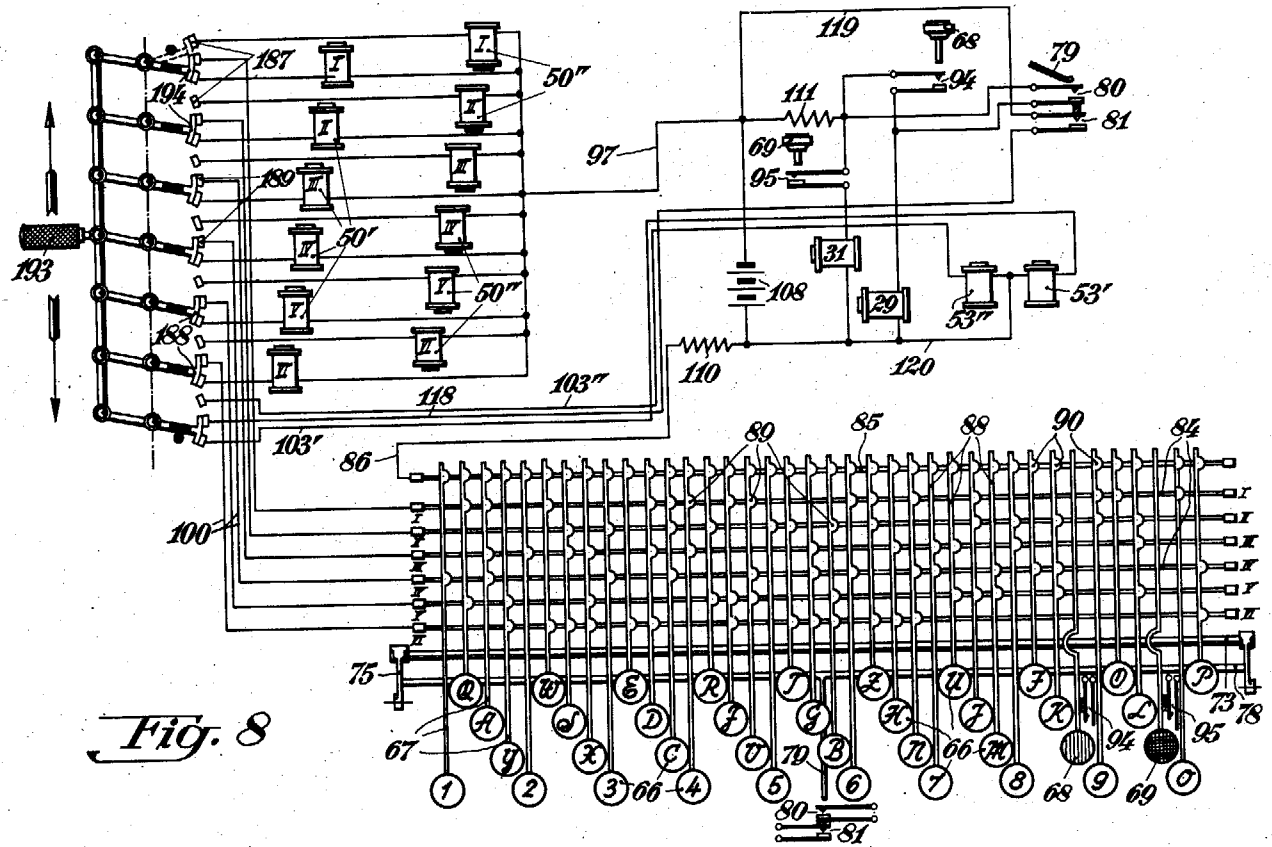
Fig. 8 illustrates the diagram of the machine.

As may be seen from the circuit diagram according to Fig. 8, the keys 66 are provided with contact fingers 89 on those positions on which the respective character is represented by a hole according to the scheme in Fig. 1, and it will be understood that the hole positions of any of both decks as well as the fingers 89 of the contact bars 84 being coordinated to the fingers 89 are to be counted in the same order from the uppermost to the lowermost position. The contact bars 84 are connected by lines 100 with the six upper contacts 189 of the switch; consequently, if the switch is in the upper position as shown in Fig. 8, the selector magnets 50' of the upper deck are connected with the lines 100, and in the lower position of said switch the six selector magnets 50'' of the lower deck are in connection with said lines. All magnets 50' and 50'' are in turn connected by a common line 97 with the upper pole of the current source 108 and the back line bar 85 which is common to all keys, is connected by a line 86 over resistance 110 with the lower pole of the current source. The lowermost contact of the switch 193 connects in the illustrated position the line 118 leading to the contact 81 with the line 103' leading to the punch magnet 53' of the upper deck, and if the switch is in the lower position the line 118 will be connected with line 103'' leading to the punch magnet 53'' of the lower deck. The contact 81 to which line 118 is connected, is on the other hand connected to the upper pole of the current source over line 119. To the current source 108 is over a resistance 111 the magnet connected which is controlled by the contact 95, and also the carriage shift magnet 29 being controllable by the contact 94 as well as by the parallelly arranged contact 80. It will be seen that upon depression of the release key 69 the contact 95 will be closed thereby energizing the magnet 31 so that the carriage is permitted to return to its home position, as has been explained more in detail in a previous part of the specification. Since upon each punching operation the contact 80 is closed by the finger 79, the carriage is permitted to shift after deenergization of the magnet 29 so that the next column of the card will be fed under the punching stamps. The key 68 is only actuated if the carriage is to be shifted step by step without effecting any punching operation.

*Operation of the machine*

If the carriage (Figs. 1 and 2) is in the extreme left hand position, the card to be perforated is inserted into the carriage and the same is moved to the extreme right hand position so that the first column of the card will be positioned under the punching stamps 33. By positioning the shift lever 193 (Fig. 1) the upper or lower deck must then be selected for perforation; if at first the upper deck is to be punched, the shift lever 193 is moved to its upper position. If now any character key 66 (Fig. 8) is depressed, the contact fingers 89 and 90 will at first establish a corresponding connection between the bar 85 and the bars 84 contacted by the fingers 89 so that, in accordance with the contact fingers 89 of the depressed key a current circuit will be established over the corresponding selector magnets, said circuit leading, over line 86, bar 88, selected contact bars 84, corresponding lines 100, selector magnets 50', and finally over common line 97 back to the current source. Since the lines of the selector magnets 50'' are open at 187, only the upper group of the selector magnets 50' may be energized. Upon the further downward movement of the key, the frame 73, 74, 75, 78 (Fig. 3) will close by means of finger 79 the contact 80 so that the carriage shift magnet 29 (Fig. 8) will be energized; however, the carriage is only permitted to shift after deenergization of said magnet and then the punching operation is already completed as will be seen from the following explanation. If the key has reached its lowermost position, the finger 79 closes also the contact 81 thereby energizing the punch magnet 53' and causing the following current flow: from the upper pole of the current source 108 over line 129, contact 81, line 118, lowermost contact springs 189, 194, 188, line 103, magnet 53' and line 120 to the lower pole of the current source. If the punch magnet 53' becomes energized, the yoke 52' will encounter the projections 44 of the controlling slide bars 43' (Fig. 2) which have been moved to punching position by the energized selector magnets 50', and the corresponding punching stamps will be pressed downwardly through the card in a combination corresponding to the meaning in the key. If then the key returns under the influence of its spring 93' and of the resiliently mounted frame 73, 74, 75 to its home position, the punch magnet 53' will at first be deenergized consequently to the opening of contact 81 (Fig. 8), and the coordinated punching mechanism will be restored under the influence of the spring 59' (Fig. 2), and the punching stamps 33' will return under the influence of their springs 41 to normal position, so that upon the subsequent deenergization of magnet 29 (Fig. 8) the carriage is permitted to shift consequently to the opening of contact 80. In this way any desired columns of the upper deck may be punched, and it will be seen that letters or numeral characters, as desired, may be punched in any column of the upper deck.

If then the lower deck is to be punched, the operator moves the carriage (Figs. 1 and 2) again to the right and shifts the lever 193 to its lower position so that now the lines 100 (Fig. 8) are connected with the selector magnets 50'' and the line 118 is connected over line 103'' to the punch magnet 53''. If now a key 66 is depressed, current circuits will be established in a similar way as has been described, but now the selector magnets 50'' and the punch magnet 53'' of the lower deck will be actuated. After energization of the selector magnets 50'' the punch magnet 53'' will be energized over lines 118, 103'' consequently to the closure of the contact 81 said lines being then connected with one another so that a hole combination corresponding in its meaning to the depressed key will be punched whereupon the carriage will again shift to the next column. It will be seen that in this way any or all columns of the lower deck may be punched with any desired characters.

The key according to which the hole combinations of the different characters are arranged is, of course, of no importance for the present invention and in the above described embodiment has one of the known hole combination keys been used. If another key is to be used, the contact fingers of the actuator keys must, of course, be provided in a position conforming to the chosen key or punching scheme.

In the foregoing explanation an electromechanical embodiment of the invention has been explained. The invention may, however, be executed as well in a pure mechanical way and also with quite different operating means and it will be clearly seen that the same is by no means restricted to the aforedescribed or a similar embodiment.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention, and it is the intention therefore, to read the following claims in the light of this understanding.

What I claim is:

1. In a perforating machine for record cards having a plurality of superpositioned record decks, each deck comprising a plurality of adjacent record columns, an individual set of punching means for each record deck, each set comprising punching stamps for a single record column, a single set of keys for controlling a set of punching means, punch selecting means for said punching means, said selecting means being under the control of said keys, means for shifting said punching means and the record card column by column relatively to one another by each key actuation, means for actuating the selected punching means by each key actuation, and shifting means common to all keys of said set of keys for selectively controlling any of said sets of punching means through said punch selecting means by said single set of keys.

2. In a perforating machine for record cards having a plurality of superpositioned record decks, each deck comprising a plurality of adjacent record columns, an individual set of punching means for each record deck, each set comprising punching stamps for a single record column, a single set of keys for controlling a set of said punching means, a set of punch selecting means for each set of punching means, said selecting means being under the control of said keys, means for shifting said punching means and the record card column by column relatively to one another by each key actuation, means for actuating the selected punching means by each key actuation, and shifting means common to all keys of said set of keys for operatively connecting said single set of keys to any one of said set of punch selecting means.

3. In a perforating machine for record cards having a plurality of superpositioned record decks, each deck comprising a plurality of adjacent record columns, an individual set of punching stamps for each deck, the distance of said sets of punching stamps in the direction of superpositioned aligned record columns being larger than the distance between adjacent punching stamps of each set in the same direction, a common set of keys for governing said punching stamps successively column by column, and shifting means common to all keys of said set of keys for selectively governing any one of said sets of punching stamps by said common set of keys.

4. In a perforating machine for record cards having a plurality of superpositioned record decks, each deck comprising a plurality of adjacent record columns, for each deck a row of punching stamps provided for a single record column, projections on said punching stamps extending sidewardly with respect to the row of stamps, springs engaging beneath said projections for holding the punching stamps in their normal raised position, a single set of keys for controlling said punching stamps, means for shifting the record card and the punching stamps column by column relatively to each other by each key actuation, and shifting means common to all keys of said set of keys for controlling any one of said rows of punching stamps by said single set of keys.

5. In a perforating machine for record cards having a plurality of superpositioned record decks, each deck comprising a plurality of adjacent record columns, for each deck a row of punching stamps provided for a single record column, the various rows of punching stamps being in alignment transversely to the record decks and the distance between said rows of punching stamps being larger than the distance between adjacent punching stamps in said rows, a single set of keys for controlling said punching stamps, means for shifting the record card and the punching stamps column by column relatively to each other by key actuation, and shifting means common to all keys of said set of keys for controlling any one of said rows of punching stamps by said single set of keys.

6. In a perforating machine for record cards having a plurality of superpositioned record decks, each deck comprising a plurality of adjacent record columns for hole combinations, an individual set of punching means for each record deck, each set comprising punching stamps for a single record column, a single set of keys for controlling a set of punching means in hole combinational arrangements, punch selecting means for said punching means, said selecting means being under the control of said keys, means for shifting said punching means and the record card column by column relatively to one another by each key actuation, means for actuating the selected punching means by each key actuation, and shifting means common to all keys of said set of keys for selectively controlling any of said sets of punching means through said punch selecting means by said single set of keys.

7. In a perforating machine for record cards having a plurality of superpositioned record decks, each deck comprising a plurality of adjacent record columns for hole combinations, an individual set of punching means for each record deck, each set comprising punching stamps for a single record column, a single set of keys for controlling a set of said punching means in hole combinational arrangements, a set of punch selecting means for each set of punching means, said selecting means being under the control of said keys, means for shifting said punching means and the record card column by column relatively to one another by each key actuation, means for actuating the selected punching means by each key actuation and shifting means common to all keys of said set of keys for operatively connecting said single set of keys to any one of said sets of punch selecting means.

8. In a perforating machine for record cards having a plurality of superpositioned record decks, each deck comprising a plurality of adjacent record columns for hole combinations, an individual set of punching means for each deck, a set of selecting means for each set of punching means, a single set of keys for governing the punching means through said selecting means in hole combinational arrangements, means for shifting said selecting means and the record card column by column relatively to one another by each key actuation, shifting means common to all keys of said set of keys for operatively connecting said single set of keys to any one of said sets of selecting means for said punching means, a set of actuating means for each record deck adapted to actuate the selected punching means, said shifting means being also adapted to select the respective set of actuating means for operation.

9. In a perforating machine for record cards having a plurality of superpositioned record decks, each deck comprising a plurality of adjacent record columns, an individual set of punching means for each record deck, each set comprising punching stamps for a single record column, a set of selecting means for each set of punching means, a set of actuating means for each set of punching means, a single set of keys for governing the punching means through said selecting means, means for shifting the record card column by column relatively to said punching means by each key actuation, shifting means common to all keys of said set of keys for operatively connecting said single set of keys to any one of said sets of selecting means for said punching means, said shifting means being also adapted to select the respective set of actuating means for operation.

10. In a perforating machine for record cards having a plurality of superpositioned record decks, each deck comprising a plurality of adjacent record columns, an individual set of punching means for each record deck, each set comprising punching stamps for a single record column, a set of punch selecting magnets for each set of punching means, a punch actuating magnet for each set of punching means, a single set of keys for governing the punching means through said selecting magnets, shifting means common to all keys of said set of keys for operatively connecting said single set of keys to any one of said sets of selecting magnets and for selecting for operation the punch actuating magnet corresponding to the set of punching means under key control, and means for shifting the record card column by column relatively to said punching means by key actuation.

11. In a perforating machine for record cards having a plurality of superpositioned record decks, each deck comprising a plurality of adjacent record columns, an individual set of punching means for each record deck, a set of numeral keys and a set of letter keys, both sets of keys governing said punching means successively column by column, and shifting means common to all keys of both sets of keys for selectively governing any one of said sets of punching means by both sets of keys.

12. In a perforating machine for record cards having a plurality of superpositioned record decks, each deck comprising a plurality of adjacent record columns, an individual set of punching instrumentalities for each record deck, a single set of punch selecting and punch actuating keys, means controlled by the operation of said keys to cause said punching instrumentalities to punch a selected record deck column by column, selecting means controlled by the same keys for selecting said punching instrumentalities for successive operation to punch a selected record deck column by column, and shifting means, common to all keys of said set of keys, for selectively governing any one of said sets of punching instrumentalities by said selecting means.

13. In a perforating machine for record cards having a plurality of superpositioned record decks, each deck comprising a plurality of adjacent record columns, an individual set of punching instrumentalities for each record deck, a common set of keys for governing said punching instrumentalities successively column by column, punch selecting means controlled by said keys so constructed and arranged that the striking of a single selected key conjunctly controls a plurality of punching instrumentalities or the striking of a single selected key controls the punching instrumentalities severally, and shifting means common to all keys of said set of keys for selectively governing any of said sets of instrumentalities by the selecting means controlled by said common set of keys.

14. In a perforating machine for record cards having a plurality of superpositioned record decks, each deck comprising a plurality of adjacent record columns, an individual set of punching means for each record deck, a set of punch selecting means for each set of punching means, a common set of punch selecting and punch actuating keys, means controlled by the operation of said keys to cause said punching means to punch a selected record deck column by column, means operated by the same keys for controlling said selecting means to cause the latter to select from a selected set of punching means, said punching means successively to punch a record deck column by column, and shifting means, common to all keys of said set of keys, for operatively connecting said last named means to a selected set of said punching means.

15. In a perforating machine for record cards having a plurality of superpositioned record decks, each deck comprising a plurality of adjacent record columns, an individual set of punching means for each record deck, each set comprising punching stamps for punching a single record column, a single set of keys for controlling a set of punching means, means controlled by said keys for shifting said punching means and the record card column by column relatively to one another by each key actuation for successively coordinating the record columns of a record deck being punched with the selected punching means, and shifting means common to all keys of said set of keys for selectively controlling any of said sets of punching means by said single set of keys, said shifting means being retained in the position it is shifted during the punching of the successive record columns of the same record deck.

16. In a perforating machine for record cards having a plurality of superpositioned record decks, each deck comprising a plurality of adjacent record columns, an individual set of punching means for each deck, selecting means for said punching means, a single set of keys for governing the punching means through said selecting means, means controlled by said keys for shifting by key actuation said punching means and the record card column by column relatively to one another, shifting means common to all keys of said set of keys for selectively governing any of said sets of punching means by said single set of keys through said selecting means, and means operable by actuation of each key for actuating the selected punching means.

17. In a perforating machine for record cards having a plurality of superpositioned record decks, each deck comprising a plurality of adjacent record columns, an individual set of punching means for each deck, a set of selecting means for each set of punching means, a single set of keys for governing the punching means through said selecting means, means operated by each key for shifting said punching means and the record card column by column relatively to one another by each key actuation, shifting means common to all keys of said set of keys for operatively connecting said single set of keys to any one of said sets of selecting means with said punching means and retaining its operative connection during the punching of the record columns of the same record deck by the punching means controlled by the selecting means operatively connected, and means operated by each key for actuating the selected punching means.

18. In a perforating machine for record cards having a plurality of superpositioned record decks, each deck comprising a plurality of adjacent record columns for receiving combinational hole punchings, an individual set of punching means for each record deck, a common set of keys, selecting means controlled by said keys for controlling said punching means to cause the latter by a single key actuation to effect punching in combinational hole arrangements successively column by column, and shifting means common to all keys of said set of keys for selectively governing any one of said sets of punching means by said common set of keys.

19. In a perforating machine for record cards having a plurality of superpositioned record decks, each deck comprising a plurality of adjacent record columns for receiving combinational hole punchings, an individual set of punching means for each record deck, a common set of keys for governing said punching means, punch selecting means effective by actuation of a single key to select said punches to cause punching in combinational hole arrangements successively column by column of the same record deck, shifting means common to all keys of said set of keys for selectively governing any one of said sets of punching means through said selecting means by said common set of keys, and means operable by each key actuation to effect the operation of the selected punching means of the selected set.

20. In a perforating machine for record cards having a plurality of superpositioned decks, each deck comprising a plurality of adjacent record columns for receiving combinational hole punchings, an individual set of punching means for each record deck, a common set of keys, an individual set of controlling means controlled by said keys and operable by actuation of a key to select said punching means and to effect punching thereby in combinational hole arrangements successively column by column of the same record deck, and shifting means common to said set of keys for operatively connecting said common set of keys to a selected set of said punch controlling means.

21. In a perforating machine for record cards having a plurality of superpositioned record decks, each deck comprising a plurality of adjacent record columns for receiving combinational hole punchings, an individual set of punching means for each record deck, each set comprising punching stamps for a single record column, a single set of keys, means operable by key actuation to select said punches and to effect the operation of a selected set of punching means to effect punching in combinational hole arrangements, means operated by said keys for shifting said punching means and the record card column by column relatively to one another by each key actuation, and shifting means common to all keys of said set of keys for selectively controlling any of said sets of punching means by said single set of keys.

22. In a perforating machine for record cards having a plurality of superpositioned record decks, each deck comprising a plurality of adjacent record columns for receiving combinational hole punchings, an individual set of punching means for each deck, selecting means for said punching means, a single set of keys for governing by single key actuation the punching means through said selecting means to select said punching means and to control punching thereby in combinational hole arrangements, means operable by each key actuation for shifting said punching means and the record card column by column relatively, shifting means common to all keys of said set of keys for selectively govrrning any of said sets of punching means by said single set of keys through said selecting means, and means operated by said keys for actuating the selected punching means.

23. In a perforating machine for record cards having a plurality of superpositioned record decks, each deck comprising a plurality of adjacent record columns for receiving combinational hole punchings, an individual set of punching means for each deck, a set of selecting means for each set of punching means, a single set of keys for governing the punching means through said selecting means to cause the latter to select by single key actuation said punching means to control punching in combinational hole arrangements, means operable by each key actuation for shifting said punching means and the record card column by column relatively to one another, shifting means common to all keys of said set of keys for operatively connecting said single set of keys to any one of said sets of selecting means for said punching means, and means operable by each key actuation for actuating the selected punching means.

MICHAEL MAUL.